United States Patent [19]

Modersohn

[11] 3,978,947

[45] Sept. 7, 1976

[54] CLUTCH BRAKE UNIT

[75] Inventor: Charles W. Modersohn, Beloit, Wis.

[73] Assignee: Warner Electric Brake & Clutch Company, South Beloit, Ill.

[22] Filed: Aug. 26, 1974

[21] Appl. No.: 500,343

[52] U.S. Cl. .......................... 192/12 BA; 192/81 R
[51] Int. Cl.² ................................... F16D 67/02
[58] Field of Search .......... 192/12 BA, 17 D, 33 C, 192/35, 36, 26, 81 R, 81 C

[56] References Cited
UNITED STATES PATENTS

| | | | |
|---|---|---|---|
| 2,298,970 | 10/1942 | Russell | 192/33 C |
| 2,475,432 | 7/1949 | Marihart | 192/12 BA |
| 2,577,181 | 12/1951 | Christensen | 192/17 D |
| 3,349,880 | 10/1967 | Baer | 192/81 R X |
| 3,572,481 | 3/1971 | Moritz | 192/26 X |
| 3,837,450 | 9/1974 | Malion et al. | 192/12 BA |

*Primary Examiner*—Benjamin W. Wyche
*Attorney, Agent, or Firm*—Leydig, Voit, Osann, Mayer & Holt, Ltd.

[57] ABSTRACT

A clutch-brake assembly includes input and output hubs, respectively, fixed and journaled on a rotatable shaft. A coil spring secured for movement with the output hub normally is wound into driving engagement between the input and the output hubs. A sleeve telescoped over the spring is fixed to the output hub and a low inertia braking member loosely mounted on the free end of the sleeve is held against substantial movement in both radial and axial directions with respect to the sleeve. In one form of the invention, a tang on the spring projects into a slot in the braking member and thus connects the member with the spring so the member normally rotates with the shaft but, when a braking torque is applied to the member, the spring is unwound from between the two hubs to disengage from them and subsequently to transmit the braking torque to the output hub to retard rotation thereof. In another form of the invention, a tang is integrally formed with the braking member to engage the input end of the spring. Intermediate the ends of the first convolution of the input end of the spring, a bend extends axially outward to hold the braking member normally away from the input end of the spring. When the braking member is pushed toward the spring during braking, the input end of the spring rocks outwardly to engage with the tang so the spring is unwound from the hubs by relative rotation between the braking member and the output hub.

12 Claims, 7 Drawing Figures

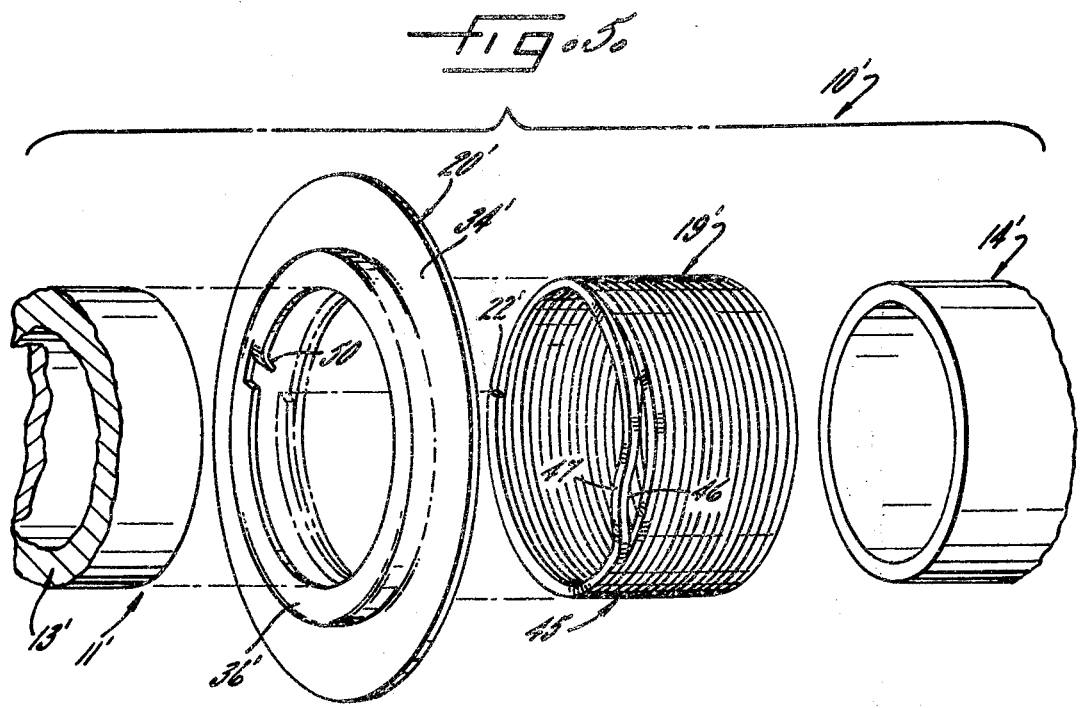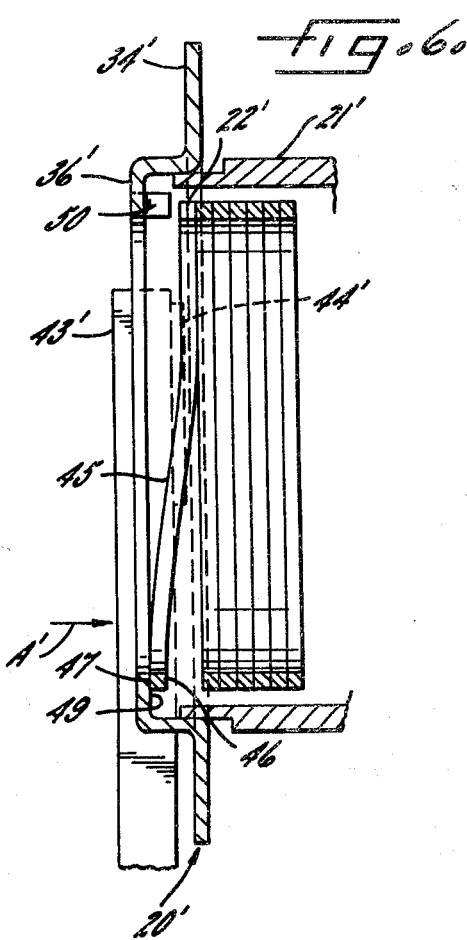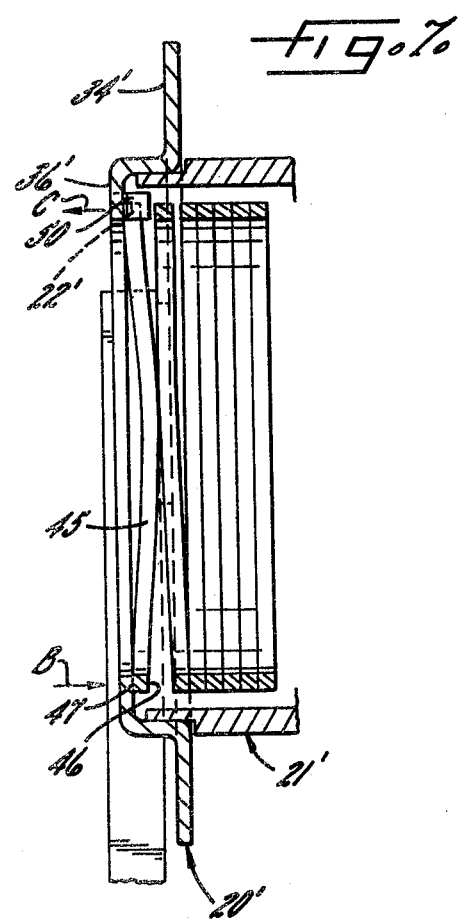

CLUTCH BRAKE UNIT

BACKGROUND OF THE INVENTION

This invention relates to a clutch-brake assembly of the type having an input hub fixed on a rotatable shaft and normally connected by a coil spring to an output hub journaled on the shaft so the output hub rotates with the input hub and the shaft. More particularly, the invention relates to an assembly of the foregoing type in which the input end of the spring is connected to a braking member so that the member normally rotates with the output hub. When the braking member is held against rotation, the spring is unwound from engagement between the input and output hubs so the output hub no longer rotates with the shaft.

SUMMARY OF THE INVENTION

The primary object of the present invention is to provide a new and improved clutch-brake assembly of the foregoing general character which is adapted particularly for operation under high speed and high inertia load conditions and which is uniquely constructed so as to virtually eliminate involuntary declutching or fake braking resulting from undesired movement of the braking member relative to the input hub such as may be caused by motor power impulses, vibrations or otherwise jiggling the clutch-brake assembly.

Another important object of the present invention is to provide an assembly in which there is virtually no slippage between the input and output hubs when the brake is released and the clutch is engaged so the assembly is much more responsive to engagement and disengagement of the clutch than prior similar clutch-brake assemblies and so the assembly avoids heating up during use.

A more detailed object is to accomplish the foregoing through the provision of a low-inertia braking member which is supported loosely within the assembly so that involuntary movement of the member fails to produce any declutching action.

The invention also resides in the novel manner in which the braking member is supported loosely in the assembly while also being kept from engagement with the input hub.

Still further, the invention resides in the unique construction of the assembly whereby the spring is utilized to transmit braking torque from the braking member to the output hub and also is kept from engagement with the input hub during braking so as to avoid any loss in the braking torque transmitted to the output hub.

In a second embodiment, the invention further resides in utilizing a portion of the spring to urge the braking member normally out of torque-transmitting contact with the input end of the spring so that even if the braking member is moved involuntarily relative to the output hub no braking torque tending to unwind the spring will be transmitted to the spring by the braking member.

These and other objects and advantages of the present invention will become more apparent from the following detailed description when taken in conjunction with the accompanying drawings.

BRIEF DESCRIPTION OF THE DRAWINGS

FIG. 5 is an exploded perspective view of a second similar form of the clutch-brake assembly of the present invention with parts omitted for clarity of illustration.

FIG. 6 is an enlarged fragmentary cross-sectional view of the second form of the clutch-brake assembly also with parts omitted for clarity of illustration.

FIG. 7 is a view similar to FIG. 6 but showing parts of the assembly in moved positions.

DETAILED DESCRIPTION OF THE PREFERRED EMBODIMENTS

Figure 1:
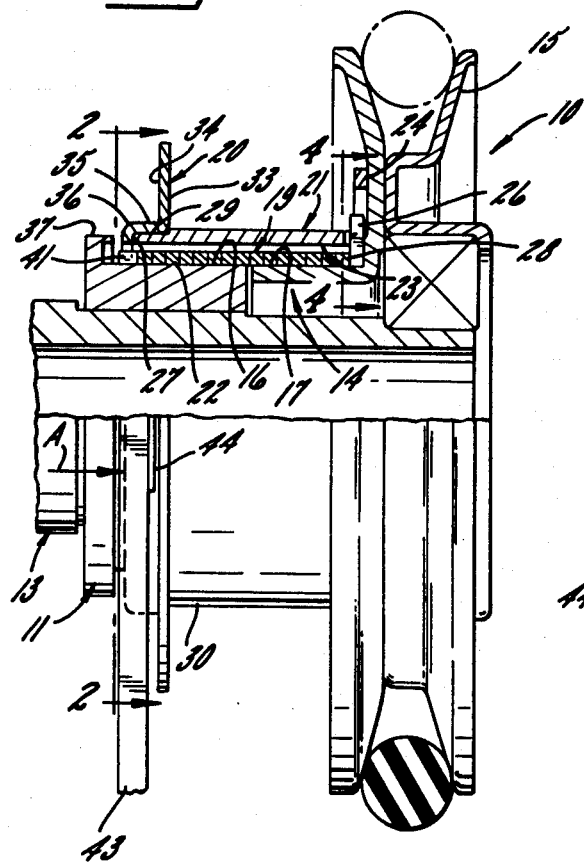
FIG. 1 is a fragmentary cross-sectional view of a clutch-brake assembly embodying the novel features of the present invention.

As shown in the drawings for purposes of illustration, the present invention is embodied in a clutch-brake assembly 10 of the type which is adapted particularly for operation under high speed and high inertia load conditions such as for use in a lawn and garden tractor (not shown). Herein, the assembly includes an input hub 11 fixed on a shaft 13 rotated by the motor (not shown) of the tractor. An output hub 14 is journalled on the shaft adjacent the input hub and includes a sheave 15 attached to one end thereof. Both the hubs include generally cylindrical surfaces 16 and 17 equally spaced from the central axis of the shaft and normally engaged by helical drive spring 19 coupling the input and output hubs to rotate together. Herein, the relaxed diameter of the spring is less than the diameters of the surfaces 16 and 17 of the hubs so the spring normally is wound tight against such surfaces to hold the hubs to rotate together with the shaft. A braking member 20 is connected to the input end 22 of the spring and normally rotates with the shaft when the clutch is engaged. To disengage the clutch, a braking torque is applied to the member causing it to rotate with respect to the shaft and unwind the spring so the latter no longer drives the output hub with the input hub.

The present invention contemplates mounting the braking member 20 in a novel fashion in the clutch-brake assembly 10 so as to virtually eliminate involuntary declutching and substantially reduce slippage between the input hub 11 and the spring 19 during initial engagement and disengagement of the clutch. For these purposes, the braking member is supported loosely in the assembly against substantial movement in both axial and radial directions relative to the shaft 13 and yet normally rotates with the shaft without being actuated by the usual power impulses of a drive motor (not shown) or other vibrations and jiggling of the assembly such as may occur during usage of the machine within which the assembly is incorporated. More particularly, the member is supported on a sleeve 21 which is telescoped over the spring and is fixed to turn bodily with the output hub. Accordingly, when the braking member is actuated, the spring expands toward the sleeve to form a torque-transmitting connection between the braking member 20 and the output hub 14 to retard rotation of the output hub with the shaft. By virtue of the foregoing arrangement, the clutch-brake assembly is made more responsive and reliable in service use by virtually eliminating overheating due to slippage between the spring 19 and the input hub 11 during initial engagement and disengagement of the clutch and also by eliminating involuntary declutching.

In the first form of the invention shown in FIGS. 1 through 4, the braking member 20 is in the form of a disk mounted on the sleeve 21 and the latter is telescoped over the input and output hubs 11 and 14 with the interior surface 23 of the sleeve spaced radially outward from the spring-engaging surfaces 16 and 17 of the hubs a distance greater than the thickness of the spring 19. Herein, the sleeve is generally cylindrical in shape and includes an annular flange 24 (see FIGS. 1 and 4) integrally formed with the fixed end thereof. The flange is secured to the sheave 15 of the output hub 14 such as by welding and a small slot 25 is formed in the fixed end of the sleeve and extends radially outward into the flange to receive a radial tang 26 projecting outwardly from the output end 28 of the spring. By virtue of this arrangement, the spring is kept from sliding axially away from the sheave and is held for rotation with the output hub 14.

As shown in FIG. 1, the braking member 20 is telescoped onto the opposite or free end portion 27 of the sleeve 21 and is journaled loosely within a slightly recessed surface 29 formed in the outside surface 30 of the sleeve. Preferably, the braking member or disk 20 is a low inertia structure including radially extending inside and outside faces 33 and 34 and an integral collar 35 which is supported loosely by the sleeve on the recessed surface. With this arrangement, the disk is held against movement in a radial direction either toward or away from the central axis of the shaft 13 while still being able to move slightly in an axial direction and to rotate on the sleeve.

To keep the disk 20 from sliding axially off the sleeve 21, an annular flange 36 (see FIGS. 1 and 2) projects radially inwardly from the end of the collar 35 into the space between the free end 27 of the sleeve and a shoulder 37 projecting radially outward from the input hub 11. The flange extends radially inward beyond the interior surface 23 of the sleeve to terminate short of the spring-engaging surface 16 of the input hub so that the disk is captivated against substantial axial movement on the sleeve. Advantageously, in this form of the invention, an annular groove 39 (see FIG. 3) is formed in the shoulder 37 adjacent the spring-engaging surface of the input hub and faces toward the spring 19 to keep the latter from engaging the shoulder 37 when the brake is actuated.

To connect the input end 22 of the spring 19 with the disk 20, a slot 40 (see FIG. 2) is formed in the flange 36 and receives an axially extending tang 41 formed on the input end of the spring. With this arrangement, the spring normally holds the disk to rotate with the input and output hubs 11 and 14 but, when the disk is held against rotation, such as by the application of a braking torque to the outside surface 34, the spring is unwound from engagement with the surfaces 16 and 17 of the two hubs (see FIG. 3) and transmits the braking torque to the output hub to retard rotation of that hub with the shaft. Advantageously, the sleeve 21 prevents the spring from unwinding beyond the limits of its strength and also serves as a torque transmitting member when the spring is unwound enough to bind against the interior surface 23 of the sleeve. In this way, the disk, spring and sleeve act as a unit through which braking torque is transmitted to the output hub 14.

Figure 2:
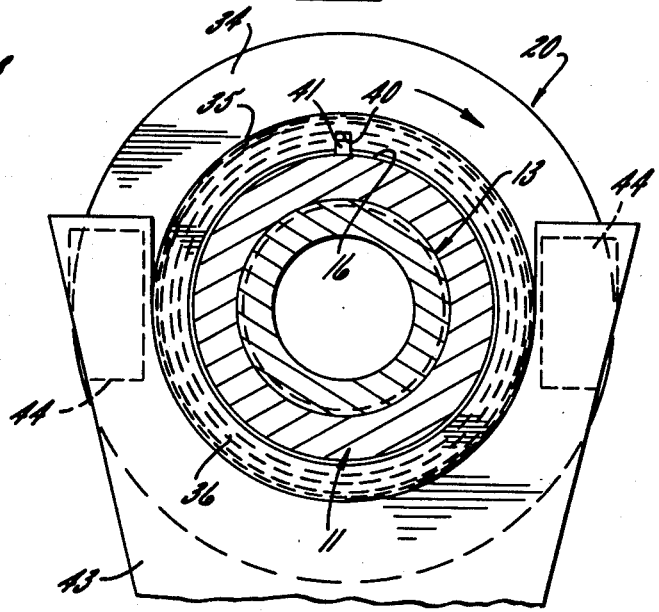
FIG. 2 is a cross-sectional view taken substantially along line 2—2 of FIG. 1.
Figure 3:
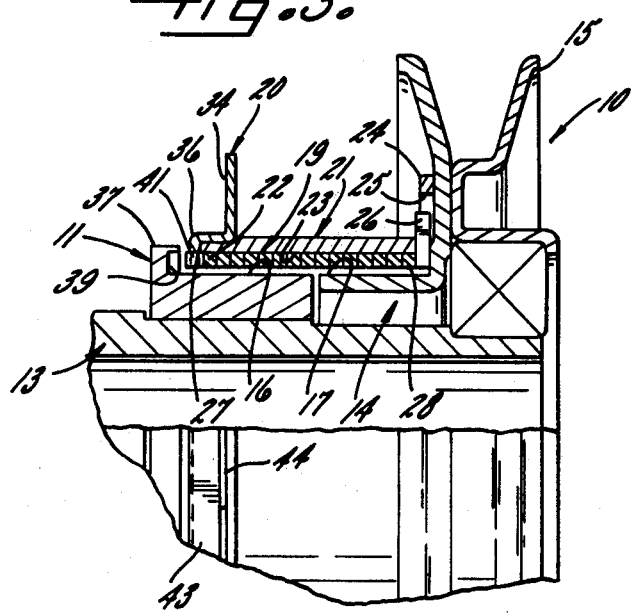
FIG. 3 is a view similar to FIG. 1 but showing parts of the clutch-brake assembly in moved positions.
Figure 4:
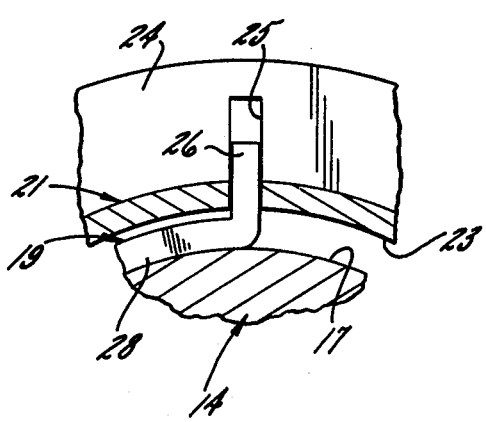
FIG. 4 is an enlarged cross-sectional view taken substantially along line 4—4 of FIG. 1.

Although various means may be employed to apply a braking torque to the disk 20, the present assembly 10 is constructed particularly for use under high inertia load conditions by virtue of the unique combination of a friction brake arrangement with the exemplary coil spring drive arrangement. Herein, the braking torque is applied to the disk by movement of a yoke 43 into engagement with the outside face 34 of the disk. As shown in FIGS. 1 and 2, the yoke is formed with wear pads 44 adapted for engagement with the disk at positions located diametrically of each other so as to apply the braking torque to the disk when the yoke is moved in the direction of the arrow A such as by pulling on a brake cable (not shown). Thus, instead of applying the entire braking torque to the output hub 44 instantaneously upon declutching, a friction torque is applied over an extended period of time to adapt the present coil-spring clutch-brake assembly for use under high speed and high inertia load conditions. Moreover, by virtue of the low inertia characteristics of the disk, when the yoke is released from engagement with the disk, the spring 19 easily rotates the disk on the sleeve and winds down against the surfaces 16 and 17 of the input and output hubs 11 and 14, respectively, so the latter are coupled to rotate together. Because the disk fits loosely on the sleeve and also because of the disk's low inertia, the disk is kept from overriding and bouncing against the tang 41 to cause involuntary declutching and slippage of the spring on the input hub as the disk and output hub begin to rotate with the shaft 13.

Thus, it is seen from the foregoing that the clutch-brake assembly 10 of the present invention brings to the art a novel arrangement particularly adapted to eliminate involuntary declutching and slippage between the input hub 11 and the spring 19 while also providing an assembly which is more responsive to engagement and disengagement of the clutch. Advantageously, these objectives are achieved through the provision of the low-inertia braking disk 20 which is mounted loosely on the sleeve 21 so that the power impulses from the motor of the tractor or other vibrations and jiggling of the assembly such as may occur during usage of the assembly in a lawn and garden tractor are kept from causing slippage and involuntary declutching in the assembly.

In the second embodiment, shown in FIGS. 5 through 7, parts corresponding to similar parts of the first embodiment are indicated by the same but primed reference numbers. To emphasize the functional and structural differences between the first and second embodiments of the present invention, only those parts considered pertinent to the description of the second embodiment have been included in FIGS. 5, 6 and 7 with other parts, which are virtually identical to those of the first embodiment, being omitted for purposes of clarity in illustration. While the clutch-brake assembly 10' in the second embodiment of the invention functions in essentially the same manner as the first clutch-brake assembly, the connection between the braking member 20' and the spring 19', advantageously, is adapted to provide for the transmission of a braking torque to the output hub 14' only when the yoke 43' is moved into engagement with the braking member. Accordingly, during normal operation of the assembly, the braking member or disk 20' is free to rotate on the sleeve 21' so that, should the disk tend to rotate relative to the rotating shaft 13' as the result of power impulses in the tractor motor or from other vibrations, such rotation or tendency to rotate has no effect upon the spring. That is, rotation of the disk does not tend to unwind the spring simply because there is no torque-transmitting connection between the disk and the spring during the normal drive mode of the assembly. When the tractor is braked, however, the yoke slides the disk axially inward, in the direction of the arrow A' (see FIG. 6) so that parts of the disk and spring are coupled together to form a torque-transmitting connection causing the spring to be unwound from the input hub 11' as the output hub 14' continues to rotate with the input hub until declutching is completed. Thereafter, the friction brake functions in the same manner as in the first embodiment to retard rotation of the output hub with the shaft 13'.

As shown in FIGS. 5 and 6, the first convolution 45 of the input end portion of the spring 19' is formed with a bend 46 which, in the normal drive mode of the clutch-brake assembly 10', that is when the clutch is engaged, extends outwardly in an axial direction beyond the input end 22' of the spring. Herein, the bend is located intermediate the ends of the first convolution so as to be positioned diametrically from the input end of the spring. Accordingly, the intermediate portion of the first convolution at the bend normally is spaced axially outward from the intermediate portion of the next adjacent convolution of the spring but with the opposite ends of the first convolution axially engaged with the next adjacent convolution.

In the drive mode, the outside surface 47 of the bend 46 engages the inside surface 49 of the annular flange 36' of the disk 20' (see FIG. 7) thereby yieldably supporting the disk in an outward axial position with respect to the input end 22' of the spring 19' so that the disk is relatively free to rotate with respect to the sleeve 21' without tending to unwind the spring. Friction between the sleeve and the disk and between the bend and the disk usually is sufficient to hold the disk so that it rotates with the sleeve during the normal drive mode of the clutch-brake assembly 10'.

To form the torque-transmitting connection between the braking disk 20' and the spring 19' when braking, the disk advantageously is constructed with a tang 50 projecting axially in a generally inward direction from the flange 36'. Preferably, the tang is formed integrally with the flange and is simply bent inwardly from the inside surface thereof as shown in FIG. 7 to abut with the input end 22' of the spring and to unwind the latter when the disk is moved axially inward by the yoke 43' to declutch the assembly. When the disk is moved inwardly by the yoke, the bend 46 is rocked inwardly in the direction of the arrow B (see FIGS. 6 and 7) toward the intermediate portion of the next adjacent convolution of the spring. At the same time, the input end of the spring is rocked outwardly in an axial direction, as represented by the arrow C (see FIG. 7) to engage with the tang of the braking disk. As in the first form of the assembly, the pads 44' of the yoke frictionally engage the outside surface 34' of the disk to hold the latter against rotation with the shaft 13'. Accordingly, when the input end of the spring abuts the tang, the spring is unwound from the input and output hubs 11' and 14' thereby declutching the assembly 10' and forming a torque-transmitting connection which serves to transmit frictional braking torque to the output hub to retard rotation of the output hub with the shaft 13'. It will be appreciated that by virtue of the unique arrangement for supporting the braking disk from forming a torque-transmitting connection with the spring in the second embodiment of the invention involuntary declutching is eliminated from the assembly during the drive mode simply because the disk is free to rotate relative to the spring and thus avoids engagement of the tang to unwind the spring.

I claim as my invention:

1. A clutch-brake assembly for use on a rotatable shaft including an input hub fixed on said shaft and having a generally cylindrical driving surface, an output hub journaled on said shaft adjacent said input hub and having a generally cylindrical driven surface, a generally cylindrical sleeve having one end fixed to said output hub and a free end portion telescoped over said driving and driven surfaces with the interior surface of said sleeve spaced radially outward from said two surfaces, a helical spring telescoped into the space between said sleeve and said hubs and normally being wound into torque-transmitting engagement with said driving and driven surfaces so said two hubs rotate bodily with said shaft, means holding the output end of said spring against substantial rotational and axial movement with respect to said output hub, an annular shoulder formed on said input hub and extending radially outward from said driving surface, said shoulder being spaced axially from the free end of said sleeve, and a generally circular brake disk loosely telescoped onto the free end portion of said sleeve and including an annular flange extending radially inward between the free end of said sleeve and said shoulder and beyond the interior surface of said sleeve so said disk is captivated against substantial radial and axial movement relative to said shaft, said disk normally being in engagement with the input end portion of said spring so as to rotate with said shaft and being rotatable relative to said sleeve whereby application of a braking torque to said disk retards the rotation thereof thereby unwinding said spring from engagement with said driving and driven surfaces and toward engagement with the interior surface of said sleeve so as to form a torque-transmitting connection between said disk and said output hub to retard rotation of the latter.

2. A clutch-brake assembly for use on a rotatable shaft including an input hub fixed on said shaft, an output hub journaled on said shaft adjacent one end of said input hub, a sleeve telescoped with and spaced radially from said input and output hubs, said sleeve being fixed to rotate with said output hub, a helical spring connected to said output hub and normally being wound into torque-transmitting engagement between said hubs, a braking member loosely supported by said sleeve around said shaft, yieldable means urging said member normally out of torque-transmitting engagement with said spring, and means operable to overcome said yieldable means and to move said braking member into torque-transmitting engagement with said spring so as to cause said spring to unwind from said hubs and toward engagement with said sleeve to form a torque-transmitting connection between said member and said output hub to retard rotation of said hub.

3. In a clutch-brake assembly having relatively rotatable input and output hubs, the combination of, a concentric sleeve telescoped over and spaced radially outward from said input and output hubs, said sleeve being rigidly fixed to said output hub, a helical spring telescoped into the space between said sleeve and said hubs and normally being wound into torque transmitting engagement with said hubs so the two hubs rotate bodily together, means for retaining the output end of said spring against substantial rotational and axial movement relative to said output hub, a rotatable braking member loosely supported on said sleeve against substantial radial and axial movement relative to said sleeve, means for connecting the input end of said spring for movement together with said braking member and causing said spring to unwind from said input hub during braking, friction means movable into frictional engagement with said braking member to apply a frictional braking torque thereto, and a torque-transmitting connection between said braking member and said output hub formed during braking by said spring and said sleeve whereby the frictional braking torque applied to said braking member is transmitted through said spring to said output hub to retard rotation of said output hub.

4. A clutch-brake assembly as defined by claim 3 with said spring having a relaxed diameter less than the diameter of said hubs.

5. A clutch-brake assembly as defined by claim 4 with said sleeve having one end fixed to rotate with said output hub, a free end portion opposite said fixed end, a shoulder formed on said input hub and being spaced axially from the free end of said sleeve, said shoulder projecting radially outward beyond the interior surface of said sleeve, said braking member comprising a disk loosely telescoped onto the free end portion of said sleeve and projecting radially outward therefrom, a flange integrally formed with said disk and extending radially inward into the space between said shoulder and said free end and beyond the interior surface of said sleeve so said disk is kept from moving a substantial distance both axially and radially on said sleeve while still being rotatable on said sleeve.

6. A clutch-brake as defined by claim 5 wherein said shoulder extends generally around said hub, an annular groove formed in said shoulder adjacent the outer surface of said input hub and opening toward said spring to keep the input end of said spring from engaging said shoulder.

7. A clutch-brake as defined by claim 6 wherein said flange is generally annular in shape, said means for connecting said braking member and said spring including a notch formed in said flange, an axial tang formed integrally with the input end of said spring and projecting into said notch to connect said spring for movement with said disk.

8. A clutch-brake assembly as defined by claim 7 wherein said friction means comprises a yoke supported adjacent the side of said disk opposite said input hub and being movable in a generally axial direction to engage said side to apply a braking torque to said disk.

9. A clutch-brake assembly as defined by claim 7 wherein said means for retaining the output end of said spring includes a slot formed in said sleeve adjacent the fixed end thereof, a tang integrally formed with the output end of said spring and projecting radially into said slot.

10. A clutch-brake assembly as defined by claim 4 wherein said means for connecting said braking member with said spring includes yieldable means for urging said braking member normally out of torque-transmitting engagement with said spring.

11. A clutch-brake assembly as defined by claim 10 including a tang integrally formed with said braking member and extending inwardly in a generally axial direction with respect to said spring, said yieldable means including a bend formed in the input end portion of said spring intermediate the ends of the first convolution thereof and projecting axially outward normally beyond the input end of said spring to engage said braking member, means engageable with said braking member to apply a braking torque thereto and coincidentally slide the braking member axially inward thereby rocking said bend inwardly and said input end outwardly to abut with said tang to unwind the spring from said input and output hubs during relative rotation between said braking member and said sleeve.

12. In a clutch-brake assembly having relatively rotatable input and output hubs, the combination of, a sleeve telescoped with and spaced radially from said input and output hubs, said sleeve being rigidly fixed to said output hub, a helical spring connected to said output hub for rotation therewith and normally being wound into torque-transmitting engagement between said hubs, a braking member loosely supported on said sleeve, torque-transmitting connection means formed between said braking member and said output hub by said spring and said sleeve during braking for unwinding said spring from torque-transmitting engagement with said input hub and into engagement with said sleeve and for transmitting a friction braking torque through said spring and to said output hub to retard rotation thereof as said frictional braking torque is applied to said braking member.

* * * * *